United States Patent
Chen

(10) Patent No.: US 8,416,587 B2
(45) Date of Patent: Apr. 9, 2013

(54) SYNCHRONOUS RECTIFIER CONTROL CIRCUITS AND METHODS OF CONTROLLING SYNCHRONOUS RECTIFIERS

(75) Inventor: Wei Chen, Saratoga, CA (US)

(73) Assignees: Silergy Technology, Sunnyvale, CA (US); Silergy Semiconductor Technology (Hangzhou) Ltd., Hangzhou (CN)

( * ) Notice: Subject to any disclaimer, the term of this patent is extended or adjusted under 35 U.S.C. 154(b) by 552 days.

(21) Appl. No.: 12/313,435

(22) Filed: Nov. 20, 2008

(65) Prior Publication Data

US 2010/0124086 A1      May 20, 2010

(51) Int. Cl.
*H02M 3/335* (2006.01)

(52) U.S. Cl. .................. 363/21.14; 363/21.06; 363/127

(58) Field of Classification Search ............... 363/21.06, 363/21.07, 21.1, 21.14, 21.15, 49, 52, 53, 363/77, 81
See application file for complete search history.

(56) References Cited

U.S. PATENT DOCUMENTS

| | | | | |
|---|---|---|---|---|
| 6,434,026 | B1 * | 8/2002 | Malik et al. ................. | 363/21.14 |
| 7,158,392 | B2 * | 1/2007 | Hosokawa et al. ......... | 363/21.06 |
| 2003/0117119 | A1 * | 6/2003 | Bridge ........................ | 323/282 |
| 2007/0263421 | A1 * | 11/2007 | Kyono ........................ | 363/127 |
| 2008/0030181 | A1 * | 2/2008 | Liu et al. .................... | 323/283 |
| 2008/0111531 | A1 * | 5/2008 | Hasegawa et al. .......... | 323/284 |
| 2008/0266907 | A1 * | 10/2008 | Kim et al. ................... | 363/21.1 |
| 2009/0168464 | A1 * | 7/2009 | Lin et al. .................... | 363/21.06 |
| 2009/0231895 | A1 * | 9/2009 | Hu ............................. | 363/127 |

OTHER PUBLICATIONS

International Rectifier, IR1167 Data Sheet, Mar. 2008, obtained at: http://www.itf.com/product-info/datasheets/data/ir1167aspbf.pdf.
Phillips, TEA1761 Data Sheet, Mar. 31, 2006, obtained at: http://www.powerever.cn/files/tea1761.pdf.
Fu, et al., "An Improved Novel Driving Scheme of Synchronous Rectifiers for LLC Resonant Converters," Feb. 2008, pp. 510-516, APEC, 23rd Annual IEEE.
Fu, et al., "1MHz High Efficiency LLC Resonant Converters with Synchronous Rectifier," Jun. 2007, pp. 2404-2410, PESC, IEEE.

* cited by examiner

*Primary Examiner* — Adolf Berhane
*Assistant Examiner* — Gustavo Rosario Benitez
(74) *Attorney, Agent, or Firm* — Michael C. Stephens, Jr.

(57) ABSTRACT

Methods and circuits for synchronous rectifier control are disclosed herein. In one embodiment, a synchronous rectifier control circuit can include: (i) a first sense circuit to sense a voltage between first and second power terminals of a synchronous rectifier device prior to a turn-on of the device, where a timing of the turn-on of the synchronous rectifier device is adjustable using a first control signal generated from the first sense circuit; (ii) a second sense circuit configured to sense a voltage between the first and second power terminals after a turn-off of the device, where a timing of the turn-off of the device is adjustable using a second control signal generated from the second sense circuit; and (iii) a driver control circuit configured to receive the first and second control signals, and to generate therefrom a gate control signal configured to drive a control terminal of the synchronous rectifier device.

34 Claims, 14 Drawing Sheets

SYNCHRONOUS RECTIFIER CONTROL CIRCUITS AND METHODS OF CONTROLLING SYNCHRONOUS RECTIFIERS

FIELD OF THE INVENTION

The present invention generally relates to the field of semiconductor devices. More specifically, embodiments of the present invention pertain to synchronous rectifiers in switching power supply regulators using power transformers.

BACKGROUND

Voltage regulators, such as DC-to-DC voltage converters, are used to provide stable voltage sources for various electronic systems. Efficient DC-to-DC converters are particularly needed for battery management in low power devices (e.g., laptop notebooks, cellular phones, etc.). A switching voltage regulator generates an output voltage by converting an input DC voltage into a high frequency voltage, and then filtering the high frequency input voltage to generate the output DC voltage. Specifically, the switching regulator includes a switch for alternately coupling and decoupling an input DC voltage source (e.g., a battery) to a load (e.g., an integrated circuit (IC)). An output filter, typically including an inductor and a capacitor, may be coupled between the input voltage source and the load to filter the output of the switch, and thus provide the output DC voltage. A controller (e.g., a pulse width modulator, a pulse frequency modulator, etc.) can control the switch to maintain a substantially constant output DC voltage.

Conventional isolated power supplies can include one or more primary switches, at least one power transformer, and at least one rectifier on a secondary side. A power transformer is used to provide a relatively large voltage conversion ratio, a more robust short circuit protection on an input source, and both primary and secondary isolation to conform to certain power regulations. The rectifier may be used to rectify an AC voltage and/or current waveform output from a transformer secondary winding into a DC voltage and/or current to supply an output load.

SUMMARY

Embodiments of the present invention relate to synchronous rectifiers in switching power supply regulators using power transformers.

In one embodiment, a synchronous rectifier control circuit can include: (i) a first sense circuit configured to sense a voltage between first and second power terminals of a synchronous rectifier device prior to a turn-on of the synchronous rectifier device (e.g., a MOS transistor), where a timing of the turn-on of the synchronous rectifier device is adjustable using a first control signal generated from the first sense circuit; (ii) a second sense circuit configured to sense a voltage between the first and second power terminals of the synchronous rectifier device after a turn-off of the synchronous rectifier device, where a timing of the turn-off of the synchronous rectifier device is adjustable using a second control signal generated from the second sense circuit; and (iii) a driver control circuit configured to receive the first and second control signals, and to generate therefrom a gate control signal configured to drive a control terminal of the synchronous rectifier device.

In another embodiment, a method of controlling a synchronous rectifier can include: (i) sensing a voltage between first and second power terminals of a synchronous rectifier device prior to a turn-on of the synchronous rectifier device; (ii) adjusting a timing of the turn-on of the synchronous rectifier device using a first control signal; (iii) sensing a voltage between the first and second terminals of the synchronous rectifier device after a turn-off of the synchronous rectifier device; (iv) adjusting a timing of the turn-off of the synchronous rectifier device using a second control signal; and (v) driving a control terminal of the synchronous rectifier device using a gate control signal, the gate control signal being generated from the first and second control signals.

Embodiments of the present invention can advantageously provide for high efficiency synchronous rectifiers. Further, embodiments of the present invention can be suitable for power supplies using power transformers. Certain embodiments of the present invention can be applied to power supplies without power transformers. These and other advantages of the present invention will become readily apparent from the detailed description of preferred embodiments below.

BRIEF DESCRIPTION OF THE DRAWINGS

FIG. 2 is an example equivalent circuit model of the MOS transistor when the transistor is on.

DETAILED DESCRIPTION

Figure 1A:
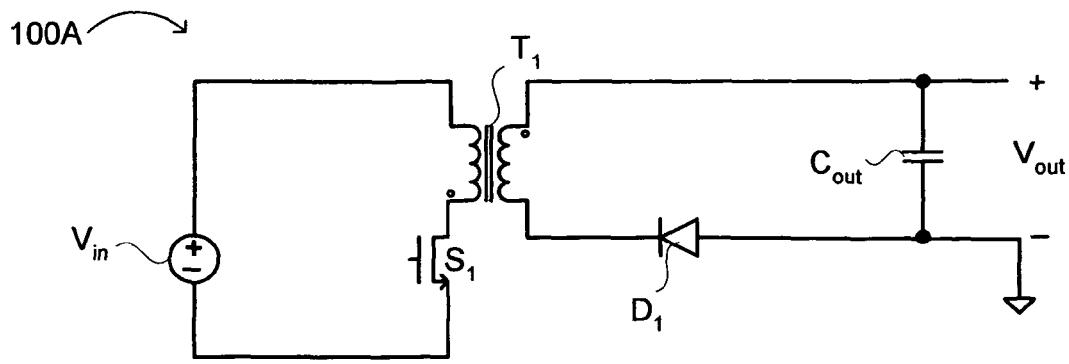
FIG. 1A is a schematic diagram of an example Flyback circuit using a rectifier.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on code, data bits, data streams, signals, or waveforms within a computer, processor, controller, device and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming" or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide for high efficiency synchronous rectifiers. Further, embodiments of the present invention can be suitable for isolated power supplies. The invention, in its various aspects, will be explained in greater detail below with regard to exemplary embodiments.

Any suitable input and regulated output voltages can be accommodated in particular embodiments. For example, in a buck step down regulator, an input voltage can range from about 2.5 V to about 5.5 V, such as from about 2.7 to about 4.2 V, and including about 4.2 V. Regulated output voltages in such a step down regulator example can range from about 0.8 V to abut 2.2 V, and including from about 1 V to about 1.8 V, and more specifically about 1.5 V. For example, some such voltages can apply in a cell phone application, and can be utilized for main chip power, random-access memory (RAM) power, or the like.

When an input voltage source is from a rectified AC line, or from a 48 V nominal bus in a telecom central office, the input voltage can be more than ten times higher than output voltages used for powering digital ICs, such as RAMs, DSPs and CPUs. A direct power conversion using regular buck topology may thus not be practical for such applications. A power transformer may thus be added to help step down the voltage. Also in such applications, the input source and the output load may be isolated from each other, and the power transformer can help achieve this purpose. Popular transformer based switch mode power regulator topologies include Flyback, Forward, Push-pull, Half-bridge, Full-bridge converters. To simplify the discussion, the following examples will be based on Flyback, but particular embodiments are applicable to synchronous rectifiers in any transformer based regulators.

Referring now to FIG. 1A, shown is a schematic diagram 100A of an example Flyback circuit using a rectifier. This example uses an ultra-fast p-type-n-type (PN) diode or Schottky diode as rectifier $D_1$. Because the forward voltage drop may be about 0.7 V for most such PN diodes, and from about 0.3 V to about 0.5 V for Schottky rectifier, conduction loss in rectifier $D_1$ can be substantial at high output current (e.g., about 10 A). In one example 10 A/5 V output power supply, the rectifier conduction loss can result in about 6-10% efficiency loss.

To reduce conduction loss in the rectifier, a metal-oxide-semiconductor (MOS) transistor switch having a relatively low on-resistance ($R_{dson}$) can be used in a synchronous rectifier configuration. For example, such relatively low values of $R_{dson}$ can be within a range of from about 1 mΩ to about 50 mΩ. With selection of such low $R_{dson}$ MOS transistors, a conduction voltage drop in the rectifier can be reduced to below about 0.1 V. In this fashion, power supply conversion efficiency can be drastically improved. Because this MOS transistor switch behaves like a regular rectifier in most cases, the MOS transistor switch can be referred to as a synchronous rectifier. Other types of power devices can be also used as a synchronous rectifier as described herein. For example, when a MOS transistor is used as the synchronous rectifier, the drain and source terminals of the MOS transistor correspond to the first and second power terminals of the synchronous rectifier, and the gate terminal of the MOS transistor corresponds to the control terminal of the synchronous rectifier.

Ideally, turn-on and turn-off of a synchronous rectifier MOS transistor can be decided by the drain current, as well as a drain to source voltage. For example, if an n-type MOS transistor is used as the synchronous rectifier, the MOS transistor may be turned on when the drain to source voltage becomes negative, or the current begins to flow from source to drain. The MOS transistor may be turned off when the drain to source voltage becomes positive or the current starts flowing from drain to source. However, in some cases, accurate control of the turn on and turn off timing is difficult to achieve, possibly due to: (i) an input offset and finite speed in practical comparators detecting the voltage or current zero-crossing point; (ii) an inherent delay from comparator output to driver stage output, and from a voltage change at a gate terminal of MOS transistor devices to actual turn on/off inside the MOS transistor structure; and/or (iii) parasitic inductances inside the MOS transistor package and on the printed-circuit board (PCB) layout distorts the sensed signals. This problem can become more severe when the sensed element, $R_{dson}$, becomes very low, in an effort to minimize the conduction loss.

These limitations may cause timing issues, such as the turn-off of the MOS transistor being too late. This may cause current to flow from drain to source, thus increasing circulating energy, and resulting in power losses. In some applications, this approach may not be desirable because of potential shoot through issues. Another possible timing issue is related to turn-off of the MOS transistor device being too soon. For example, when the MOS transistor is turned off before a source to drain current crosses zero, the body diode of the MOS transistor can conduct current. Because the body diode may not have sufficient forward conduction characteristics, many such configurations can have a forward voltage drop of over about 1 V. Thus, the body diode conduction can substantially increase overall power. Another possible timing issue is when turn-on of the MOS transistor device is too late. In this case, the body diode may conduct substantial current, also resulting in power conversion efficiency loss.

In one approach, more accurate current sensing information can be obtained when the MOS transistor switch is on. One approach reduces a gate voltage on the MOS transistor when the current is low in order to increase a value of the sense element $R_{dson}$ to maintain a same minimum sense voltage threshold. Because of a higher $R_{dson}$ to parasitic inductance ratio, this true current signal may be more accurately sensed. At substantially a same time, the gate voltage can be discharged to a level that that is pulled to ground when the sense signal amplitude decreases to the off threshold, thus minimizing a turn off delay. However, in an application with relatively high output current (e.g., greater than about 10 A), when the $R_{dson}$ of the MOS transistor is relatively low, the conduction loss during a gate voltage modulation stage can be significant.

Some such approaches have drawbacks associated with transformer based power supply applications because leakage inductance in a transformer secondary winding can oscillate with a parasitic capacitance on the winding and rectifiers, thus resulting in an oscillatory current waveform that may be difficult for an associated controller to detect a real zero-crossing point.

Particular embodiments may sense a drain to source voltage of the MOS transistor before the MOS transistor is turned on to achieve accurate turn-on timing. Particular embodiments can also sense the source to drain voltage after of the MOS transistor after the MOS transistor is turned off to achieve accurate turn-off timing. This is as opposed to directly sensing current or voltage information on the MOS transistor when the transistor is already in an on state. Particular embodiments can further improve light load efficiency by reducing gate driving losses under light load conditions, such as less than about 10% of a full load current (e.g., less than about 1 A output current in a power supply supplying up to about 10 A output current).

Particular embodiments include methods and circuits to accurately control turn-on and turn-off timing of synchronous rectifiers in isolated power supply applications. Thus instead of sensing rectifier current when the MOS transistor is on, particular embodiments can be used to sense a drain to source voltage before a MOS transistor is turned on to control such turn-on timing, and to sense the source to drain voltage after the MOS transistor is turned off to control the turn-off timing. Certain embodiments can further reduce the gate driving loss under light load conditions. A resulting operation of such a synchronous rectifier can achieve high efficiency and also overcome noise problems generated from the generally low $R_{dson}$ of the synchronous MOS transistors, parasitic inductance, and/or practical circuit limitations.

Figure 1B:
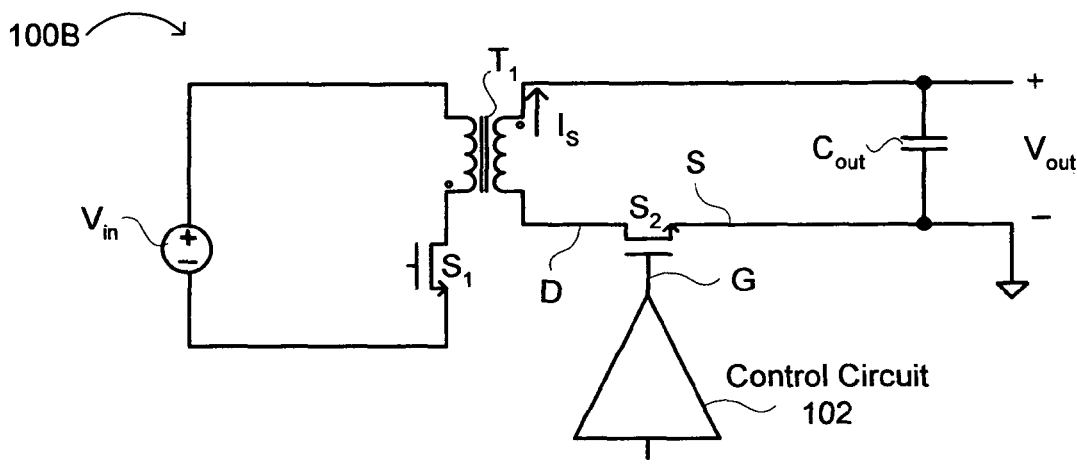
FIG. 1B is a schematic diagram of an example Flyback circuit using an n-type MOS transistor synchronous rectifier.

Referring now to FIG. 1B, shown is a schematic diagram 100B of an example Flyback circuit using an n-type MOS transistor synchronous rectifier. A Flyback converter is a buck-boost converter with an inductor split to form a transformer, such that voltage ratios can be multiplied with substantial isolation. In this particular example, NMOS transistor $S_2$ may be used as the synchronous rectifier. The drain terminal "D" of $S_2$ can be connected to a transformer $T_1$ secondary winding, and the source terminal "S" may be connected to the output ground. Control circuit 102 can be used to drive and control gate terminal "G."

In operation, $S_1$ may be turned on and off periodically in order to regulate output voltage $V_{out}$ for substantially constant output voltage applications. Similarly, $S_1$ may be turned on and off periodically in order to regulate an output current for substantially constant output current applications. Transistor $S_2$ can turn on when transistor $S_1$ is off, and $S_2$ may turn off when a secondary winding current $I_S$ decays to about 0 mA, or when $S_1$ is turned on again. In a self-driven configuration where no outside active signal (except for the voltage and current information within transistor $S_2$) commands switching actions of the transistor $S_2$, particular embodiments also apply to configurations where external active signals are used to assist and/or control the switching actions of the transistor $S_2$. Particular examples discussed herein use an n-type MOS transistor for $S_2$ and a Flyback converter topology. However, methods and circuits discussed herein can also be applied to different power devices (e.g., a p-type MOS transistor, BJT devices, etc.), and to different topologies (e.g., forward, half bridge, full bridge, etc.) converters.

In some approaches, a voltage on synchronous rectifier or MOS transistor $S_2$ when $S_2$ is on may be sensed to reflect the current information. Accordingly, accuracy of the current sense information can be largely decided by the sensed elements.

Figure 2:
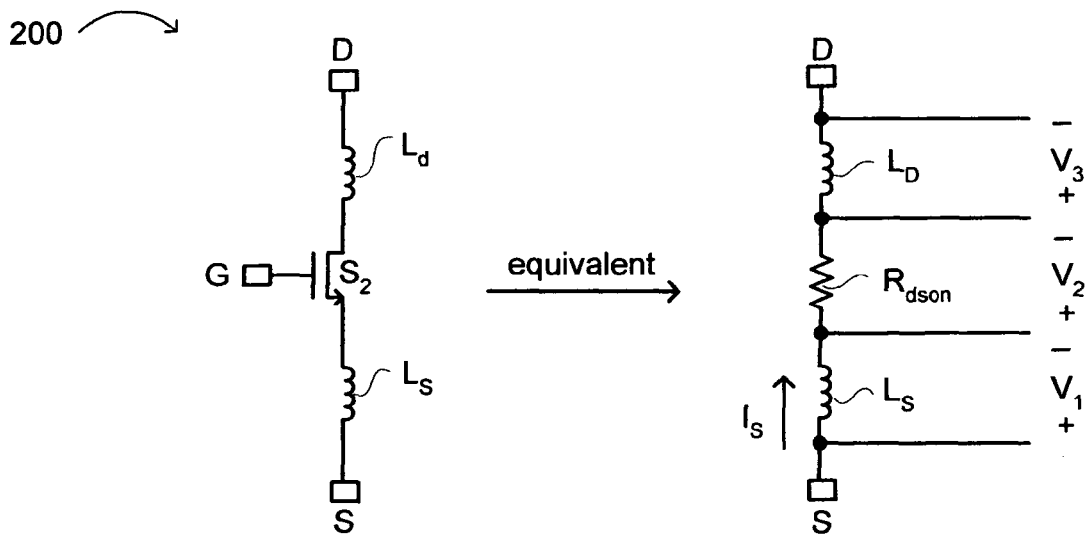

Referring now to FIG. 2, shown is an example equivalent circuit model diagram 200 of the MOS transistor when the transistor is on. It is shown that the on-resistance of MOS transistor, $R_{dson}$, and the parasitic inductance ($L_d$ and $L_s$) in the MOS transistor ($S_2$) package and related PCB layout may contribute to the sense element. Parasitic inductance can distort a current sense signal as seen by control circuit 102.

Figure 3:
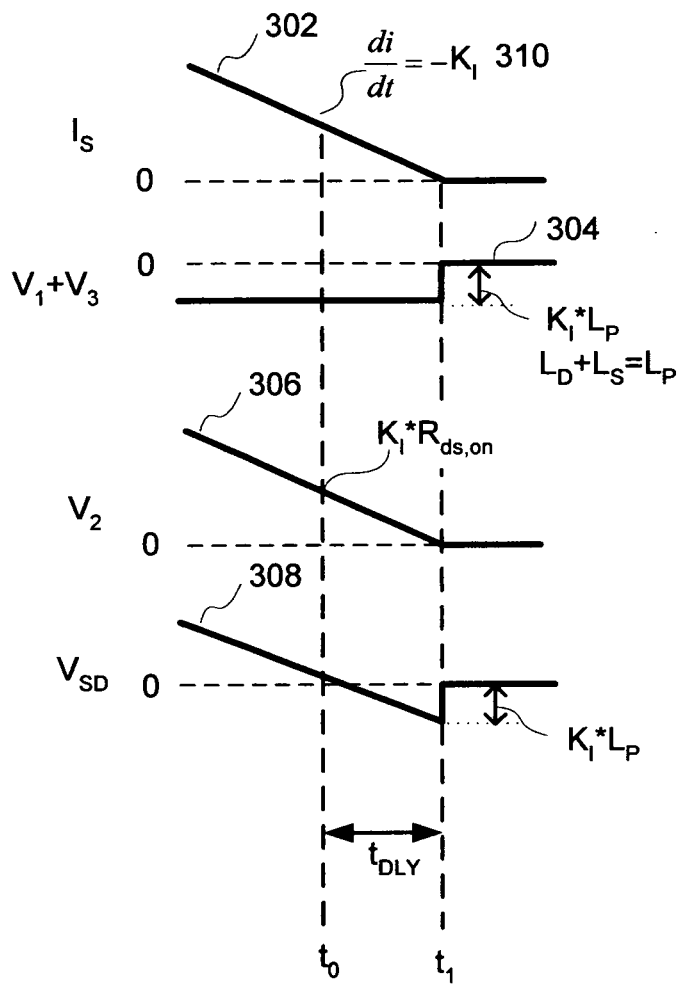
FIG. 3 is an example sensed voltage waveform on the MOS transistor when conducting current.

Referring now to FIG. 3, shown is an example sensed voltage waveform diagram 300 showing waveforms on the MOS transistor when conducting current, and using the equivalent circuit model in FIG. 2. As shown here, the sensed voltage may not accurately reflect current amplitude due to parasitic inductances in the MOS transistor package and/or the circuit traces.

There may be two sense elements in the sensed voltage information when the MOS transistor is on, as shown below in Equations 1 and 2a/2b. See waveform 302 for inductor current, $I_S$. Also, waveform 304 shows voltages $V_1+V_3$ across parasitic inductances $L_d$ and $L_s$ (Equation 1), waveform 306 shows voltage $V_2$ across $R_{dson}$, and waveform 308 shows a source to drain voltage ($V_S D$) across transistor $S_2$.

$R_{dson}$ element (1)
$$V_2 = R_{DSON} \cdot I_S$$

Leakage inductance element (2a)
$$V_1 + V_3 = L_P \frac{di_S}{dt}$$

and $V_{SD} = L_P \frac{di_S}{dt} + R_{DSON} \cdot I_S$ (2b)

In these equations, $L_P$ is the leakage inductance, $R_{DSON}$ is the on resistance of the MOS transistor, and $I_S$ is the secondary winding current flowing through the MOS transistor.

If the current waveform 302 is linearly decreased when the MOS transistor is on, there may be a DC offset introduced by the leakage inductance $L_P$. If the MOS transistor is turned off when the sensed voltage crosses zero (assuming the current also decays to zero), a substantial amount of current may flow through an internal body diode for the interval $t_{DLY}$ from time point $t_0$ to time point $t_1$. A resulting power loss can be estimated to be as shown below in Equation 3.

$$P_{body} = \frac{1}{2} f_{SW} V_F K_I \left(\frac{L_P}{R_{DSON}}\right)^2 \quad (3)$$

Here, $f_{SW}$ is the switching frequency, $V_F$ is the body diode forward conduction drop, $K_1$ is the slope of the inductor current. As can be seen, conduction loss in the body diode may be significant if the parasitic inductance is high compared to an on resistance of the transistor, $S_2$.

Figure 4A:
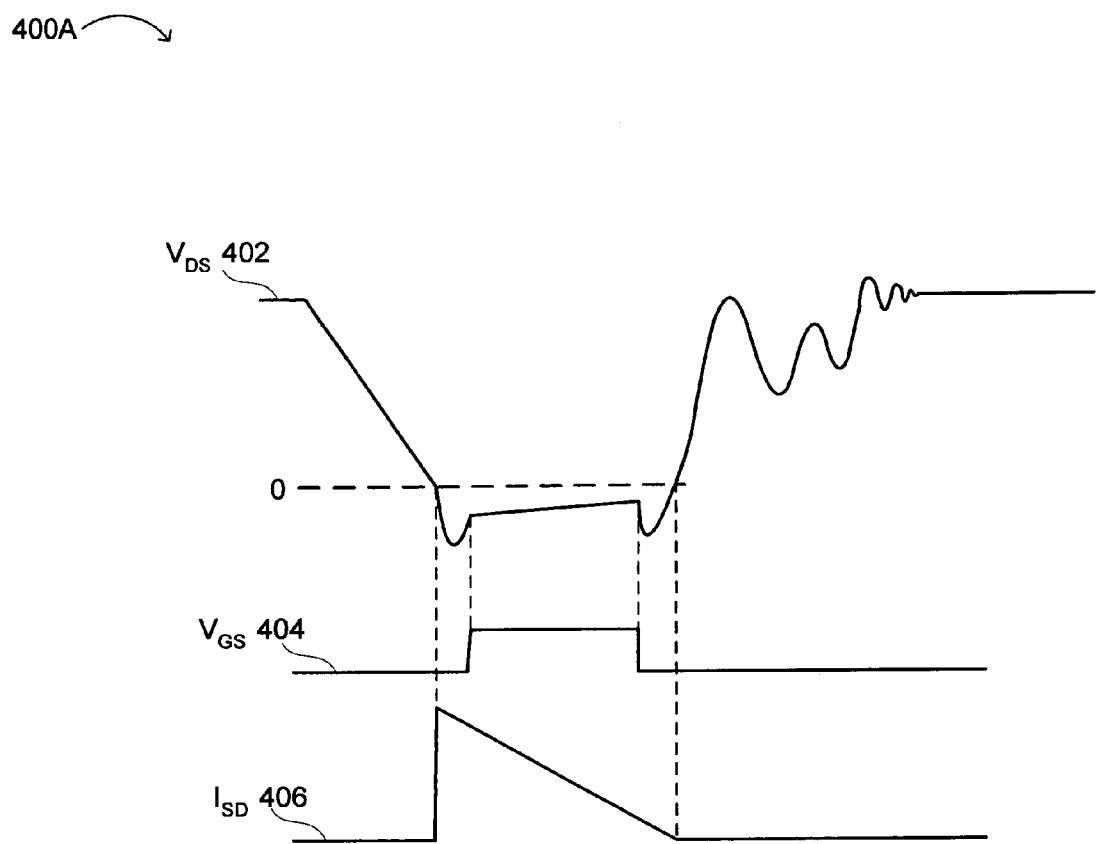
FIG. 4A shows example waveforms on the MOS transistor when the transistor is turned on too late and off too soon.

Referring now to FIG. 4A, shown are example waveforms 400A on the MOS transistor (e.g., $S_2$ in FIG. 1B) when the transistor is turned on too late and off too soon. Waveform 402 shows an example drain to source voltage ($V_{DS}$), waveform 404 shows an example gate to source voltage ($V_{GS}$), and waveform 406 shows an example current from the source to the drain ($I_{SD}$) for transistor $S_2$. Here, the body diode conducts before transistor $S_2$ turns on and after transistor $S_2$ turns off, increasing the power loss.

Figure 4B:
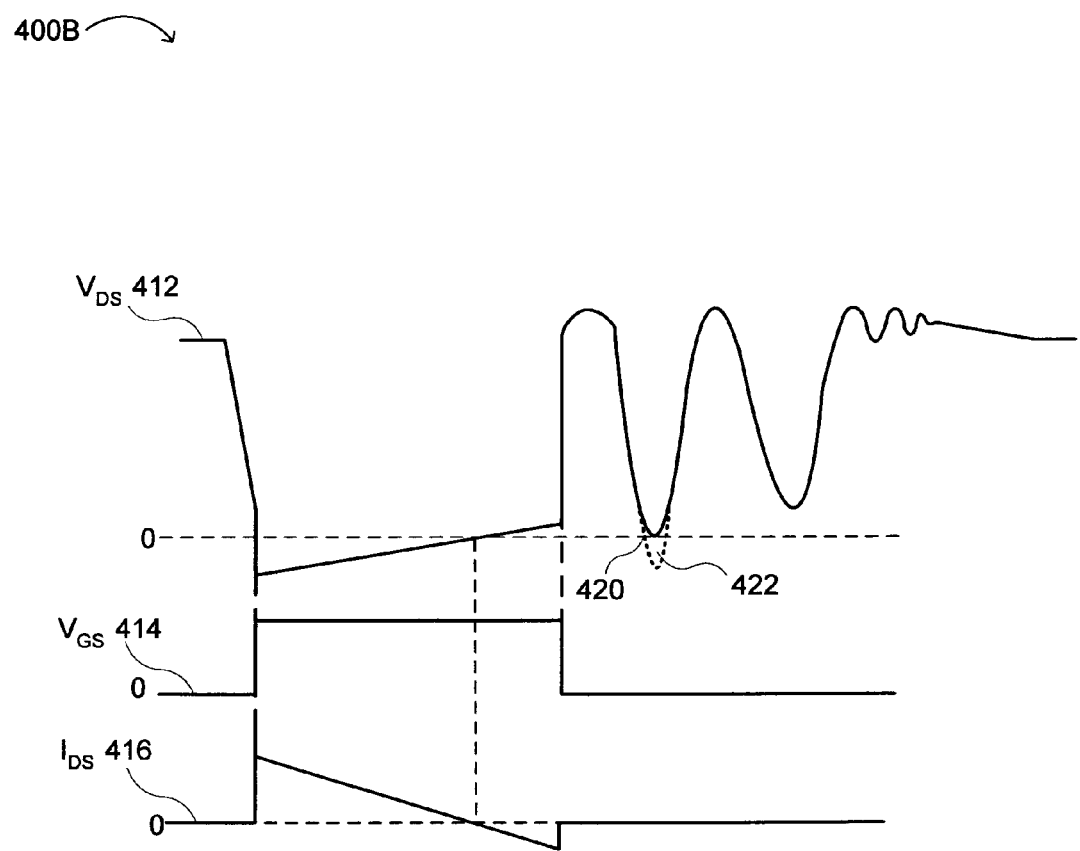
FIG. 4B shows example waveforms on the MOS transistor when the transistor is turned on too soon and off too late.

Referring now to FIG. 4B, shown are example waveforms 400B on the MOS transistor (e.g., $S_2$ in FIG. 1B) when the transistor is turned on too soon and off too late. Waveform 412 shows an example drain to source voltage ($V_{DS}$), waveform 414 shows an example gate to source voltage ($V_{GS}$), and waveform 416 shows an example current from the drain to the source ($I_{Ds}$) for transistor $S_2$. Here, premature turn-on of the transistor $S_2$ can increase capacitive turn-on loss, and late turn-off of the transistor $S_2$ may allow the current to reverse, thus increasing conduction loss and potentially causing severe circuit ringing on the transistor after turn-off. At point 420, $V_{DS}$ (shown in the dotted line) may swing below ground when the negative inductor current is high enough at turn off. This may falsely turn (see, e.g., waveform portion 422 below 0 V) on the transistor $S_2$ again in a self-driven circuit. Therefore, accurate controls of turn-off and turn-on timing of the MOS transistor $S_2$ can minimize the power loss associated with a synchronous rectifier.

To simplify the drawings and description herein, transformers are left out of the figures, and an N-type MOS transistor is shown as the synchronous rectifier. It should be noted that the transformer secondary winding may be connected to one terminal of the synchronous rectifier in a transformer based regulator topology, and other types of power devices can be used as the synchronous rectifiers in particular embodiments.

An Exemplary Synchronous Rectifier Control Circuit

In one example, a synchronous rectifier control circuit includes: (i) a first sense circuit configured to sense a voltage between first and second power terminals of a synchronous rectifier device prior to a turn-on of the synchronous rectifier device (e.g., a MOS transistor), where a timing of the turn-on of the synchronous rectifier device is adjustable using a first control signal generated from the first sense circuit; (ii) a second sense circuit configured to sense a voltage between the first and second power terminals of the synchronous rectifier device after a turn-off of the synchronous rectifier device, where a timing of the turn-off of the synchronous rectifier device is adjustable using a second control signal generated from the second sense circuit; and (iii) a driver control circuit configured to receive the first and second control signals, and to generate therefrom a gate control signal configured to drive a control terminal of the synchronous rectifier device.

Figure 5:
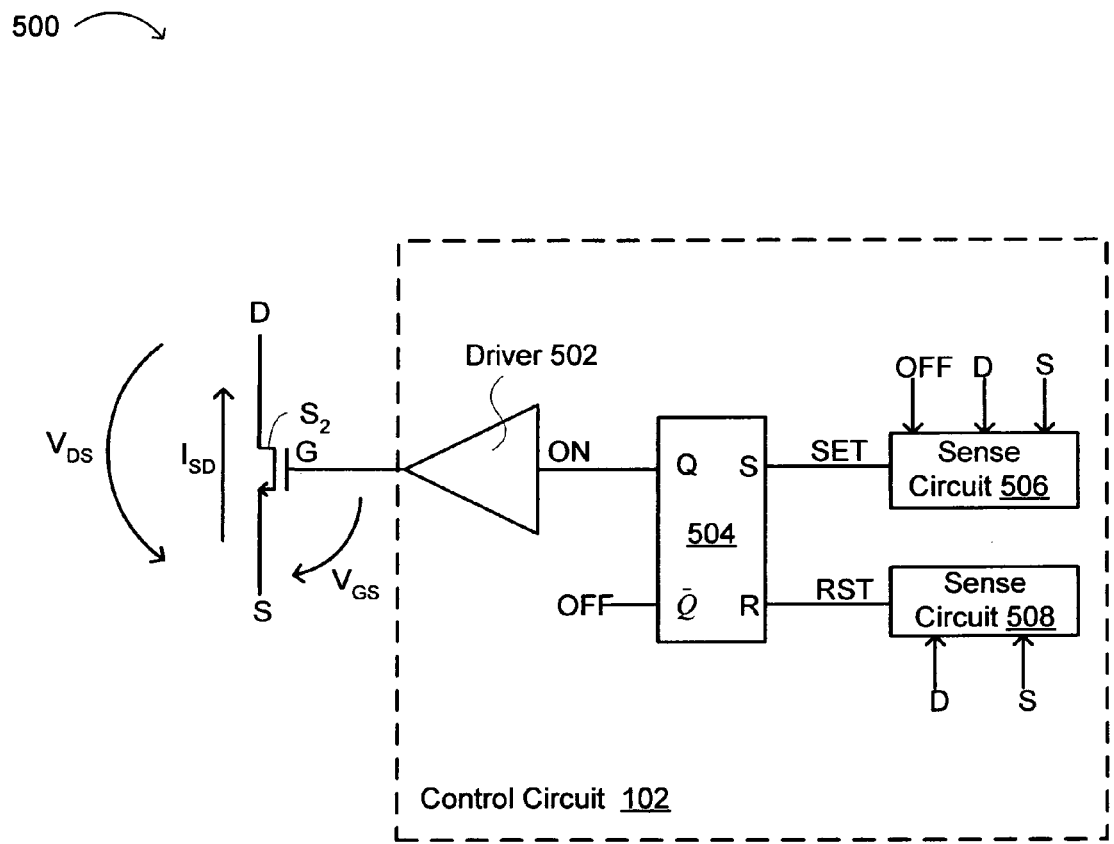
FIG. 5 is a block schematic diagram of an example synchronous rectifier in a power supply in accordance with embodiments of the present invention.

Referring now to FIG. 5, shown is a block schematic diagram 500 of an example synchronous rectifier in a power supply in accordance with embodiments of the present invention. FIG. 5 shows the circuit block details for control circuit 102 driving MOS transistor $S_2$, as applicable in the Flyback circuit example of FIG. 1B. Of course, particular embodiments are also suitable to other synchronous rectifier based circuits, as well as to other types of voltage and/or current regulators. In FIG. 5, control circuit 102 can include sense circuit 506 for setting flip-flop 504 (e.g., via "SET" control signal), and sense circuit 508 for resetting flip-flop 504 (e.g., via "RST" control signal). Driver 502 can receive the true output from flip-flop 504 for driving a gate (G) of a synchronous rectifier MOS transistor $S_2$.

Figure 6A:
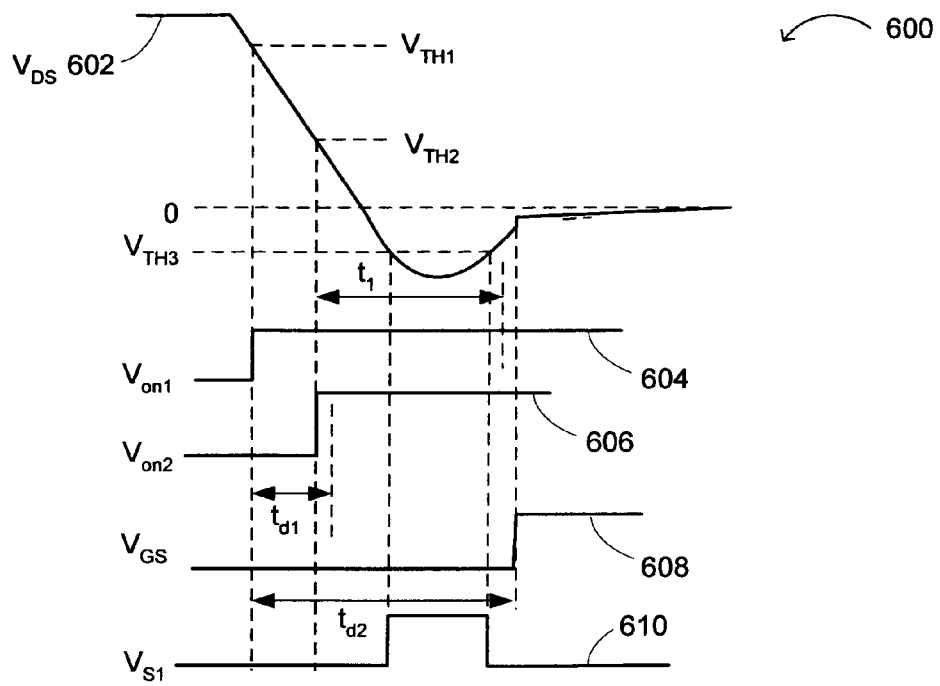
FIG. 6A shows example operation waveforms of turn-on timing control in accordance with embodiments of the present invention.
Figure 6B:
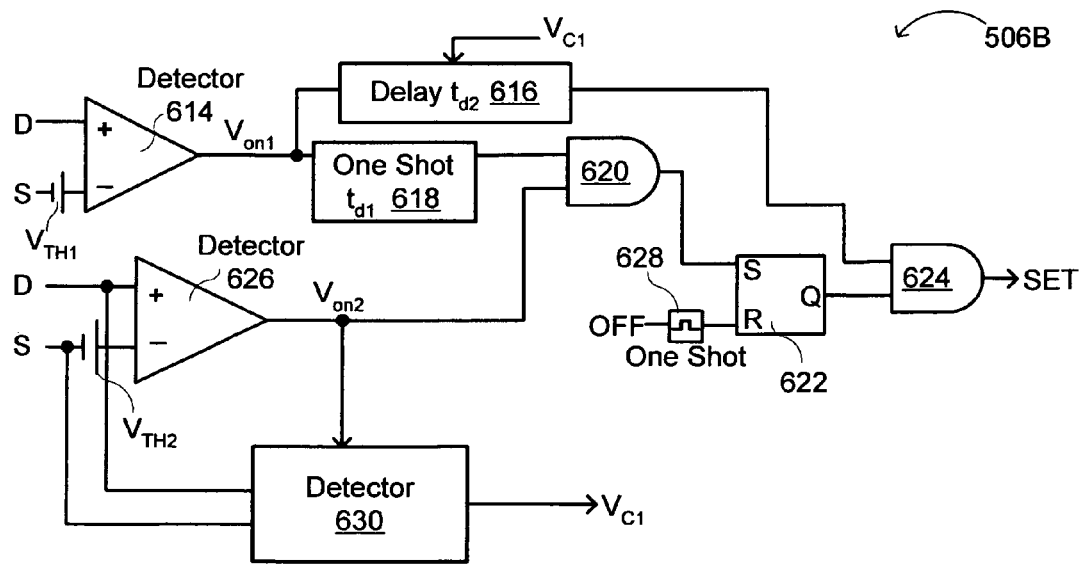
FIG. 6B shows a schematic diagram of an example first sense circuit that adjusts a second delay to optimize turn-on timing of the MOS transistor in accordance with embodiments of the present invention.

Referring now to FIG. 6A, shown are example operation waveforms 600 of turn-on timing control in accordance with embodiments of the present invention. In FIG. 6B, shown is a schematic diagram 506B of an example sense circuit (e.g., 506 of FIG. 5) that adjusts a second delay to optimize turn-on timing of the MOS transistor in accordance with embodiments of the present invention. FIG. 6B shows an example implementation of the sense circuit 506 in FIG. 5. The example operational waveforms of FIG. 6A can be viewed in conjunction with the circuit diagrams of FIGS. 5 and 6B (sense circuit 506).

When $V_{DS}$ (e.g., waveform 602) decreases below threshold $V_{TH1}$ (e.g., about 3.3 V), turn-on signal $V_{on1}$ may be generated from detection circuit or detector 614. Turn-on signal $V_{on1}$ (e.g., waveform 604) may then be passed through one-shot circuit 618 to generate a relatively narrow pulse, with a width of $t_{d1}$ (e.g., in a range of from about 1 ns to about 100 ns) and having a rising edge aligned with a rising edge of $V_{on1}$, which then can connect to an input of AND-gate 620. A rising edge of $V_{on1}$ may also be delayed by a second delay $t_{d2}$ (e.g., about in a range of from about 1 ns to about 2 us) using delay circuit 616 before being passed to an input of AND-gate 624. As $V_{DS}$ continues decreasing below a second threshold, $V_{TH2}$ (e.g., about 1.0 V), a second turn-on signal ($V_{on2}$, e.g., waveform 606) may be generated by detector 626. If a rising edge of $V_{on2}$ is within a $t_{d1}$ delay of a rising edge of $V_{on1}$, R-S flip-flop 622 can be set, and may output a high signal to an input of AND-gate 624. Then, a delayed $V_{on1}$ may be allowed to pass through AND-gate 624 to turn on MOS transistor $S_2$ (see, e.g., $V_{GS}$ control waveform 608) via the "SET" signal.

However, if a rising edge of $V_{on2}$ is outside of the $t_{d1}$ delay of a rising edge of $V_{on1}$, the MOS transistor $S_2$ may not be turned on in order to avoid a false turn-on condition that may be caused by parasitic oscillation (see, e.g., portion 422 in FIG. 4B). R-S flip-flop 622 may be reset by an off pulse input to sense circuit 506, via one-shot circuit 628. Further, delay $t_{d1}$ may be programmed by a user, such as during characterization (e.g., via fuse or non-volatile element programming), to adjust the delay for determining a valid turn-on condition. Other programming methods for adjusting delays can also be accommodated in particular embodiments.

To accurately control a turn-on timing, the $V_{SD}$ after a rising edge of turn-on signal $V_{on2}$ may be sensed by detection circuit 630. If detector 630 detects that the $V_{SD}$ indicates substantial body diode conduction, control signal $V_{C1}$ (e.g., waveform 610) is generated to reduce delay $t_{d2}$. The turn-on of MOS transistor $S_2$ can thus occur sooner, reducing body diode conduction time. However, if detector 630 detects that the $V_{DS}$ is substantially positive (e.g., greater than about 0 V), indicating a premature turn-on situation (see, e.g., a portion aligned with a rising edge of waveform 414 in FIG. 4B), control signal $V_{C1}$ can be adjusted to increase delay $t_{d2}$, thus delaying a turn-on of MOS transistor $S_2$.

Particular embodiments can include many ways to realize detection circuit 630. For example, certain implementations can include digital components, analog components, or mixed circuitry. For example, circuit components can include charge pumps, comparators, amplifiers, filters, switches, one-shot circuitry, controllable delay circuitry, etc. Shown in FIGS. 6C and 6D are two example implementations, but other suitable approaches can be accommodated.

Figure 6C:
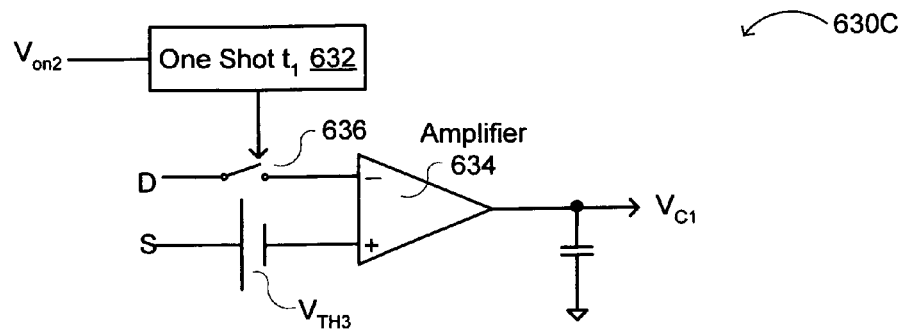
FIG. 6C shows a schematic diagram of an example third detection circuit that uses an amplifier to produce a first control signal to adjust turn-on timing in accordance with embodiments of the present invention.

Referring now to FIG. 6C, shown is a schematic diagram 630C of an example third detection circuit (e.g., detector 630 in FIG. 6B) that uses an amplifier to produce a first control signal to adjust turn-on timing in accordance with embodiments of the present invention. Here, transconductance amplifier 634 may be employed such that during an interval $t_1$ (e.g., from about 50 ns to about 500 ns) generated by one-shot circuit 632 after a rising edge of $V_{on2}$ (via switch 636) amplifier 634 integrates a difference between sensed $V_{SD}$ and a third threshold $V_{TH3}$, and produces control signal $V_{C1}$ therefrom.

Figure 6D:
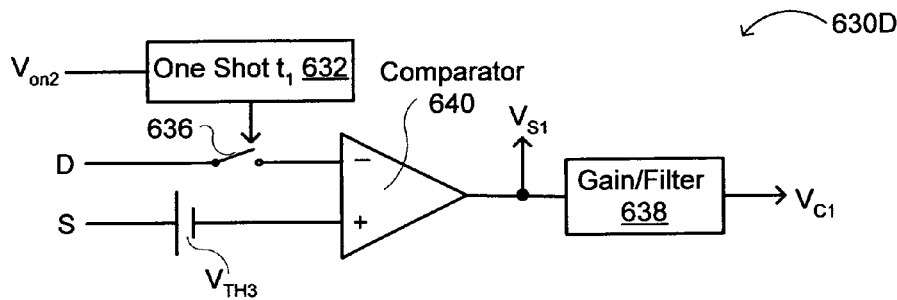
FIG. 6D shows a schematic diagram of an example third detection circuit that uses a comparator to produce a first control signal to adjust turn-on timing in accordance with embodiments of the present invention.

Referring now to FIG. 6D, shown is a schematic diagram 630D of an example third detection circuit (e.g., detector 630 in FIG. 6B) that uses a comparator to produce a first control signal to adjust turn-on timing in accordance with embodiments of the present invention. Here, comparator 640 is employed during interval $t_1$ following a rising edge of $V_{on2}$, to compare a sensed $V_{SD}$ against threshold $V_{TH3}$ (e.g., about −0.5 V). Resultant signal $V_{S1}$ can be provided as shown in waveform 610 in FIG. 6A. However, since the $V_{SD}$ waveform can be quite oscillatory due to ringing of parasitic elements after a large voltage step (e.g., in a range of from about 20 V to about 100 V) on $V_{DS}$, additional gain and/or filter stages (e.g., gain/filter 638) can be added to filter out noise in $V_{S1}$. The resulting control signal $V_{C1}$ may be used to adjust transistor $S_2$ turn-on timing, as discussed above.

Figure 6E:
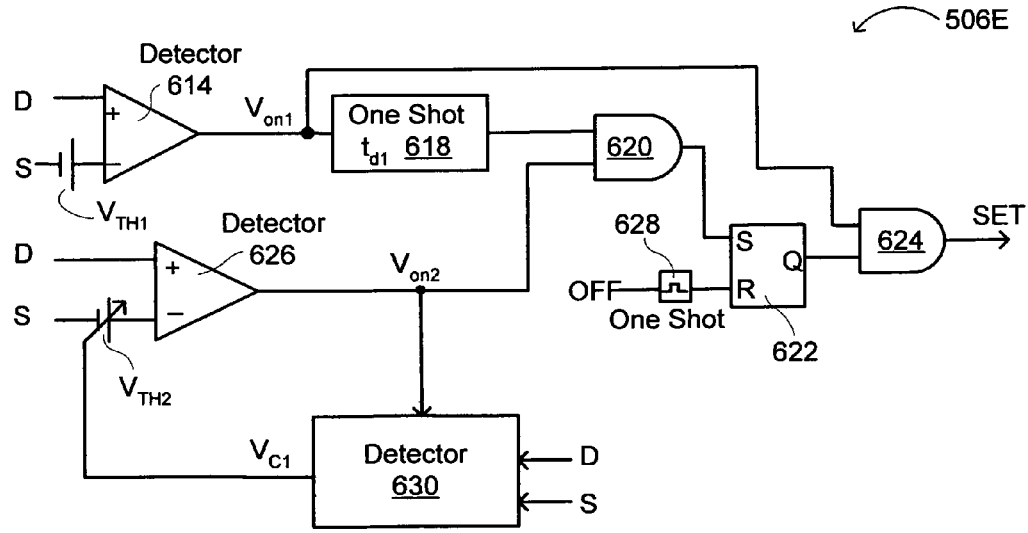
FIG. 6E shows a schematic diagram of an example first sense circuit that controls a second threshold to adjust turn-on timing in accordance with embodiments of the present invention.

Referring now to FIG. 6E, shown is a schematic diagram 506E of an example first sense circuit (e.g., 506 of FIG. 5) that controls a second threshold $V_{TH2}$ to adjust turn-on timing in accordance with embodiments of the present invention. In this particular example, threshold $V_{TH2}$ can be adjusted to control the turn-on timing of transistor $S_2$. When detection circuit 630 detects $V_{SD}$ to be below threshold $V_{TH3}$ after turn-on signal $V_{on2}$, threshold $V_{TH2}$ may be increased (e.g., from about 1 V to about 3 V) to allow $V_{on1}$ to pass AND-gate 624 sooner in comparison to the case without such a $V_{TH2}$ adjustment in order to turn on MOS transistor $S_2$ earlier. However, if detection circuit 630 detects premature turn-on with $V_{DS}$ being positive when MOS transistor $S_2$ turns on, threshold $V_{TH2}$ can be lowered to delay turn-on of the MOS transistor $S_2$.

Figure 6F:
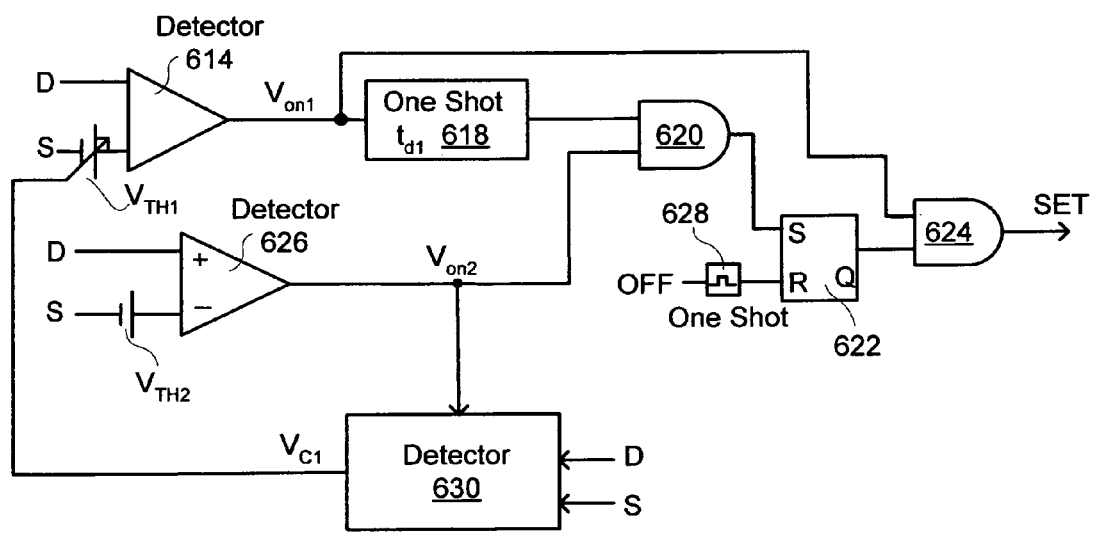
FIG. 6F shows a schematic diagram of an example first sense circuit that controls a first threshold to adjust turn-on timing in accordance with embodiments of the present invention.

Referring now to FIG. 6F, shown is a schematic diagram 506F of an example first sense circuit (e.g., 506 of FIG. 5) that controls a first threshold to adjust turn-on timing in accordance with embodiments of the present invention. In this example, threshold $V_{TH1}$ can be adjusted to control turn-on timing of MOS transistor $S_2$. When detector 630 detects $V_{SD}$ to be below threshold $V_{TH3}$ after turn-on signal $V_{on2}$, threshold $V_{TH1}$ may be increased (e.g., from about 3.3 V to about 5 V) to generate $V_{on1}$ sooner, thus turning on MOS transistor $S_2$ earlier. However, if detection circuit 630 detects premature turn-on while $V_{DS}$ remains positive when MOS transistor $S_2$ turns on, threshold $V_{TH1}$ can be lowered (e.g., from about 3.3 V to about 1.5 V) to delay turn-on of MOS transistor $S_2$. In addition, threshold $V_{TH2}$ may be adjusted in a same direction as threshold $V_{TH1}$ changes.

Figure 7A:
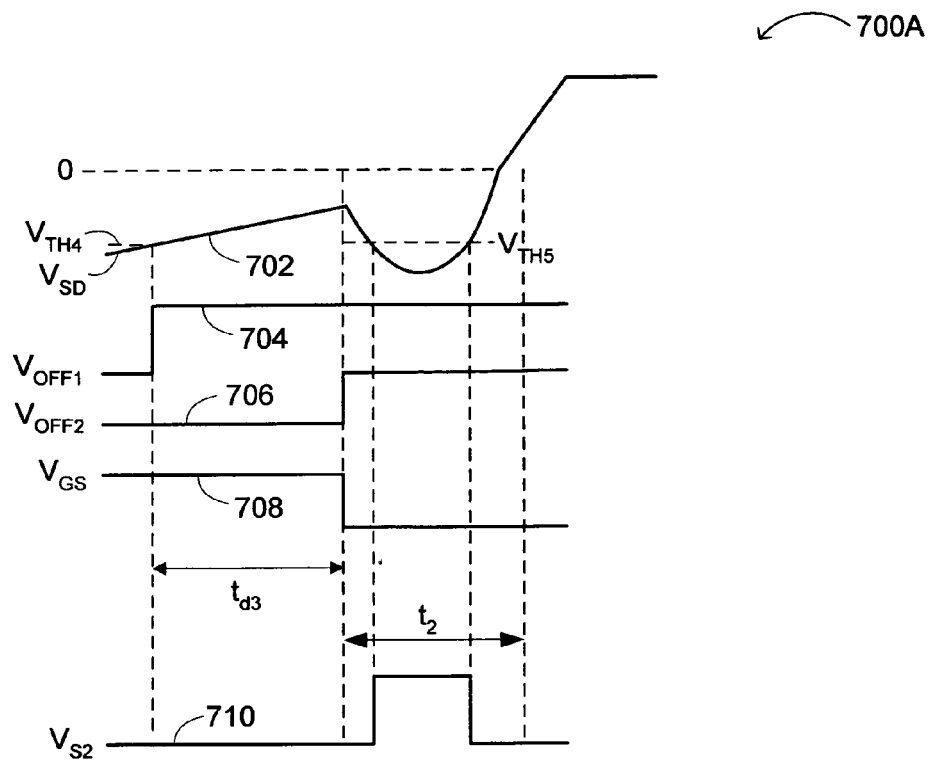
FIG. 7A shows example operation waveforms of turn-off timing control in accordance with embodiments of the present invention.
Figure 7B:
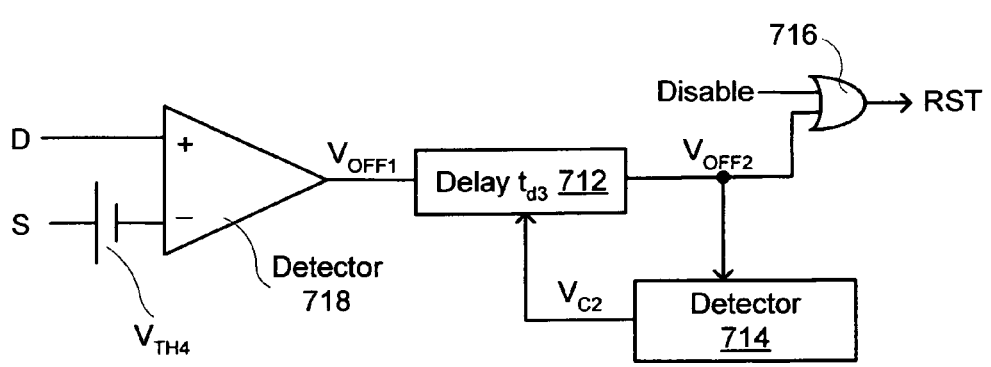
FIG. 7B shows a schematic diagram of an example second sense circuit that adjusts a third delay to optimize turn-off timing of the MOS transistor in accordance with embodiments of the present invention.

Referring now to FIG. 7A, shown are example operation waveforms 700A of turn-off timing control in accordance with embodiments of the present invention. FIG. 7B shows schematic diagram 508B of an example second sense circuit (e.g., 508 of FIG. 5) that adjusts a third delay $t_{d3}$ (e.g., from about 10 ns to about 2 us) to optimize turn-off timing of the MOS transistor in accordance with embodiments of the present invention. The example operational waveforms of FIG. 7A can be viewed in conjunction with the circuit diagrams of FIGS. 5 and 7B (sense circuit 508).

When $V_{SD}$ (e.g., waveform 702) decreases below threshold $V_{TH4}$ (e.g., about −100 mV), turn-off signal $V_{OFF1}$ (e.g., waveform 704) may be generated from detection circuit 718. A rising edge of $V_{OFF1}$ may then be delayed by delay $t_{d3}$ 712 to become turn-off signal $V_{OFF2}$ (e.g., waveform 706), which can connect to an input of OR-gate 716. As a result of $V_{OFF2}$ going high (or the disable signal being asserted), MOS transistor $S_2$ may be turned off (see, e.g., $V_{GS}$ waveform 708). For example, disable signal input to OR-gate 716 may be used to turn-off MOS transistor $S_2$ while in a shutdown or low current operation condition.

To accurately control the turn-off timing of MOS transistor $S_2$, the $V_{SD}$ after the rising edge of the second turn-off signal $V_{OFF2}$ can be sensed by detection circuit 714. If detection circuit 714 detects that the $V_{SD}$ level indicates substantial body diode conduction, detector 714 can generate control signal $V_{C2}$ (e.g., waveform 710) to increase delay $t_{d3}$. Turn-off of MOS transistor $S_2$ can be delayed accordingly, reducing body diode conduction time. If detector 714 detects that $V_{DS}$ becomes positive after MOS transistor $S_2$ is turned off, indicating a reverse current condition shown in FIG. 4B, control signal $V_{C2}$ may be generated to decrease delay $t_{d3}$. In this fashion, turn-off of MOS transistor $S_2$ can be earlier to prevent or minimize such reverse current.

Particular embodiments can include many ways to realize detection circuit 714. For example, certain implementations can include digital components, analog components, or mixed circuitry. For example, circuit components can include charge pumps, comparators, amplifiers, filters, switches, one-shot circuitry, controllable delay circuitry, etc. Shown in FIGS. 7C and 7D are two example implementations, but other suitable approaches can be accommodated.

Figure 7C:
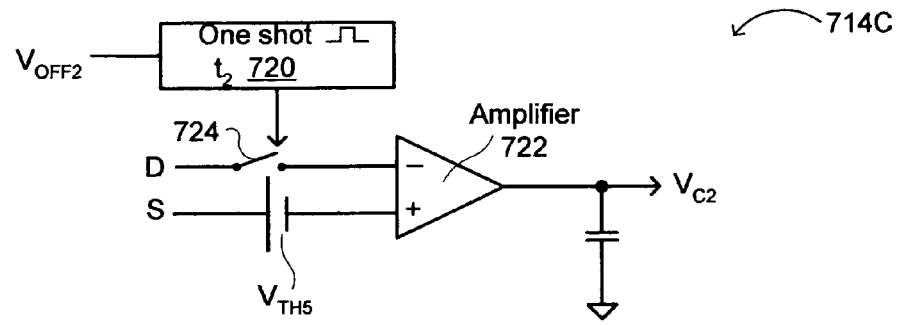
FIG. 7C shows a schematic diagram of an example fifth detection circuit that uses an amplifier to produce a second control signal to adjust turn-off timing in accordance with embodiments of the present invention.

Referring now to FIG. 7C, shown is a schematic diagram 714C of an example fifth detection circuit (e.g., detector 714 of FIG. 7B) that uses an amplifier to produce a second control signal to adjust turn-off timing in accordance with embodiments of the present invention. Here, amplifier 722 is used such that during (via one-shot 720 and switch 724) interval $t_2$ after a rising edge of $V_{OFF2}$, amplifier 722 can integrate a difference between sensed $V_{SD}$ and threshold $V_{TH5}$, thus producing control signal $V_{C2}$. For example, amplifier 722 may be a transconductance amplifier.

Figure 7D:
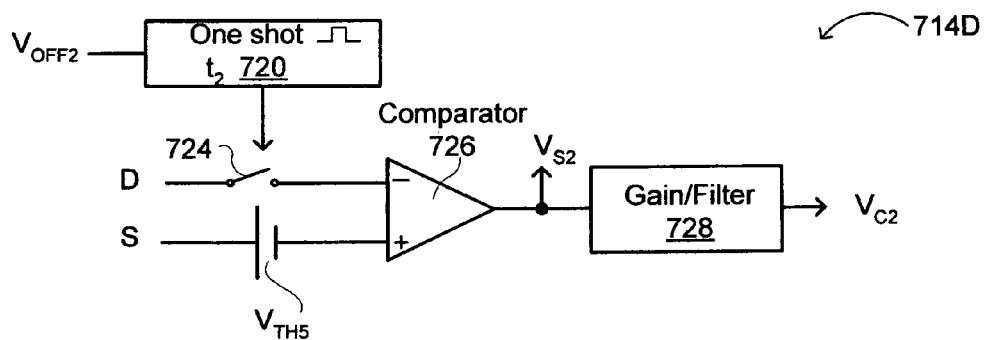
FIG. 7D shows a schematic diagram of an example fifth detection circuit that uses a comparator to produce a second control signal to adjust turn-off timing in accordance with embodiments of the present invention.

Referring now to FIG. 7D, shown is a schematic diagram 714D of an example fifth detection circuit (e.g., detector 714 of FIG. 7B) that uses a comparator to produce a second control signal to adjust turn-off timing in accordance with embodiments of the present invention. In this example, during interval $t_2$ following a rising edge of $V_{OFF2}$, comparator 726 can compare a sensed $V_{SD}$ against threshold $V_{TH5}$. Resultant signal $V_{S2}$ can be provided as shown in waveform 710 in FIG. 7A. However, since the $V_{SD}$ waveform can be oscillatory due to ringing of parasitic elements after a large voltage step on $V_{DS}$, additional gain and/or filter stages (e.g., gain/filter 728) can be added to filter out noise on $V_{S2}$. Control signal $V_{C2}$ may then be used to adjust turn-off timing for transistor $S_2$.

Figure 7E:
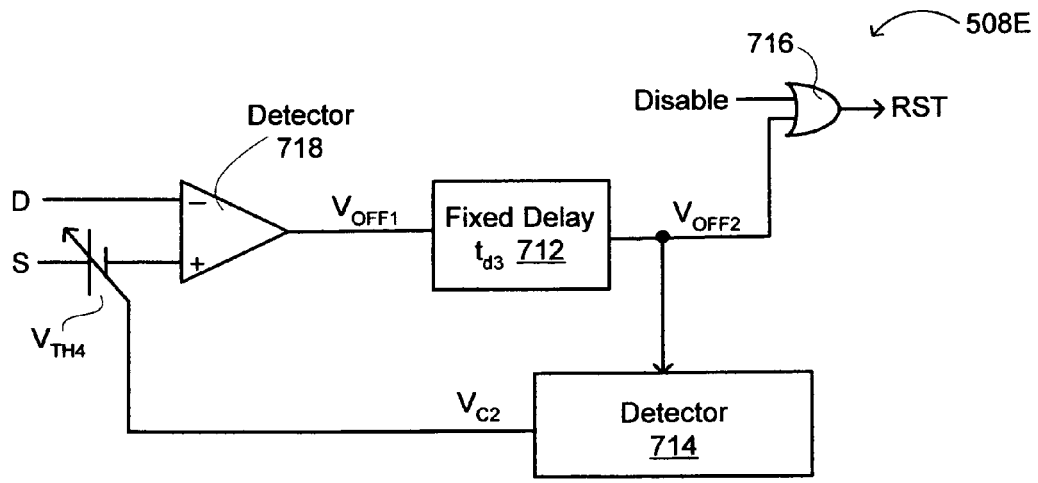
FIG. 7E shows a schematic diagram of an example second sense circuit that controls a fourth threshold to adjust turn-off timing in accordance with embodiments of the present invention.

Referring now to FIG. 7E, shown is a schematic diagram 508E of an example second sense circuit (e.g., 508 shown in FIG. 5) that controls a fourth threshold $V_{TH4}$ to adjust turn-off timing in accordance with embodiments of the present invention. When detection circuit 714 detects $V_{SD}$ to be below threshold $V_{TH5}$, threshold $V_{TH4}$ can be increased (e.g., from about −100 mV to about +100 mV) to delay a turn-off of MOS transistor $S_2$. The positive $V_{TH4}$ may be used to overcome a sense offset possibly introduced by parasitic inductances. If detection circuit 714 detects a reverse current situation when $V_{DS}$ becomes positive and increases relatively fast after MOS transistor $S_2$ turns off, threshold $V_{TH4}$ can be decreased (and become more negative) to turn off the MOS transistor earlier.

The conduction loss of the synchronous rectifier can be estimated as shown below in Equation 4. Example conduction losses in a single MOS transistor range from about 0 W to about 2 W.

$$P_C = I_{RMS}^2 R_{DSON} \quad (4)$$

The gate driving loss associated with the synchronous rectifier can be estimated as shown below in Equation 5. Example gate driving losses in a single MOS transistor range from about 1 mW to about 0.5 W.

$$P_g = f_{SW} C_{GS} V_{GS}^2 \quad (5)$$

In these equations, $C_{GS}$ can represent a gate to source capacitance of the MOS transistor $S_2$. This value of $C_{GS}$ (e.g., about 100 pF to about 10 nF) may vary slightly under different $V_{GS}$ values, but it is assumed to remain constant in the following discussion.

Figure 8A:
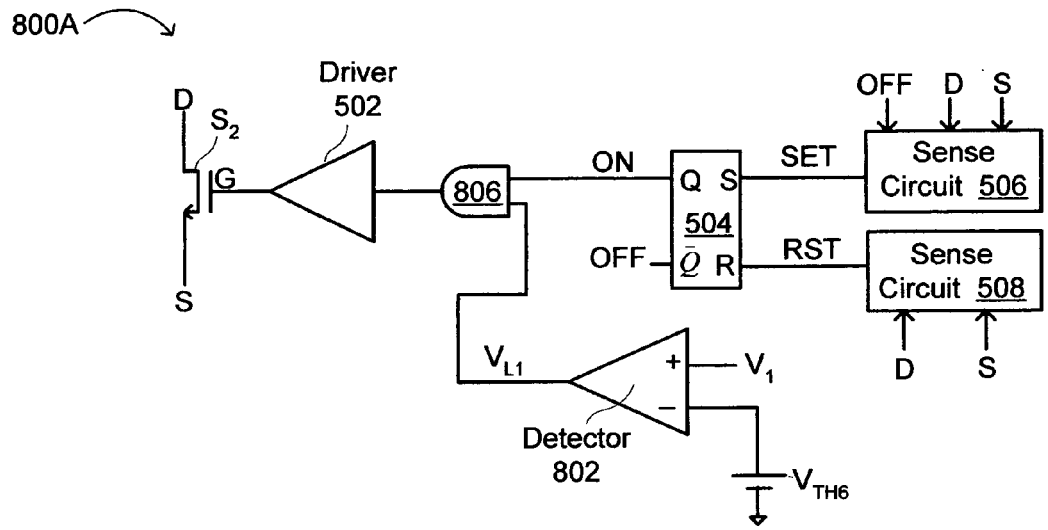
FIG. 8A shows a schematic diagram of an example circuit that turns off a MOS transistor to reduce gate driving losses under light load conditions in accordance with embodiments of the present invention.
Figure 8B:
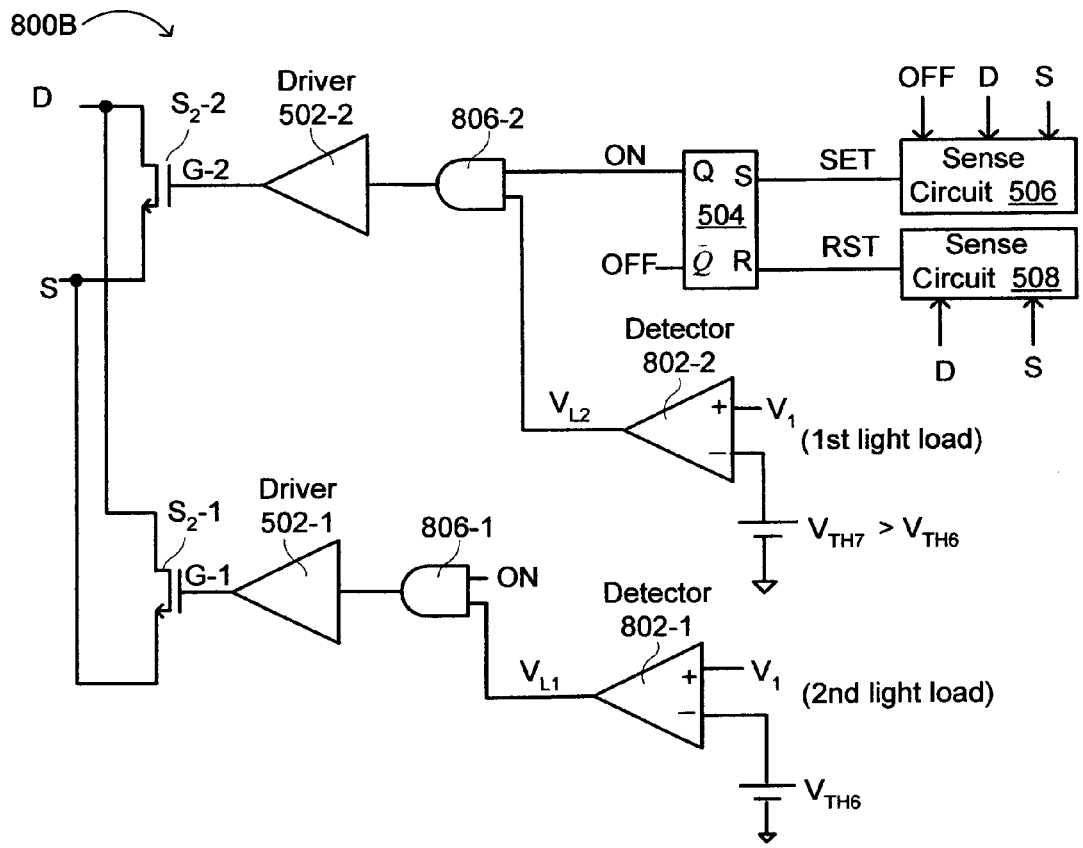
FIG. 8B shows a schematic diagram of an example circuit that turns off a portion of a MOS transistor under first light load conditions, and turns off the MOS transistor under second light load conditions, in accordance with embodiments of the present invention.
Figure 8C:
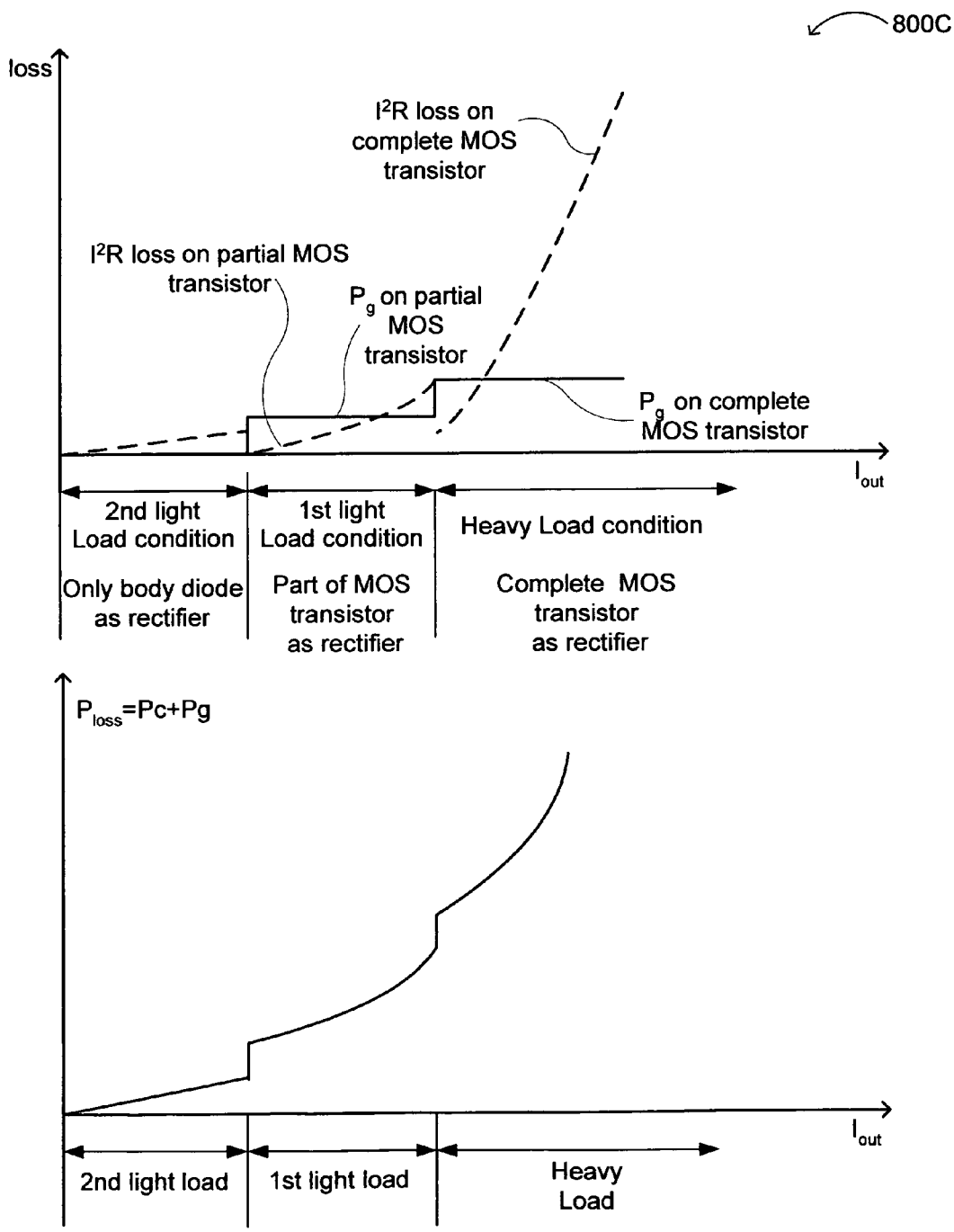
FIG. 8C shows example waveforms illustrating power loss reduction for the circuit shown in FIG. 8B.
Figure 8D:
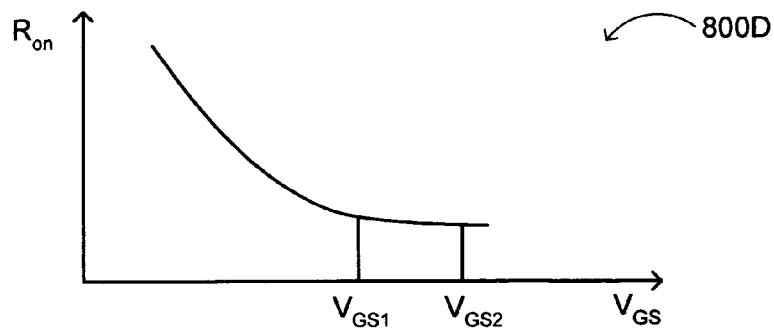
FIG. 8D shows an example $R_{DSON}$ versus $V_{GS}$ curve.
Figure 8E:
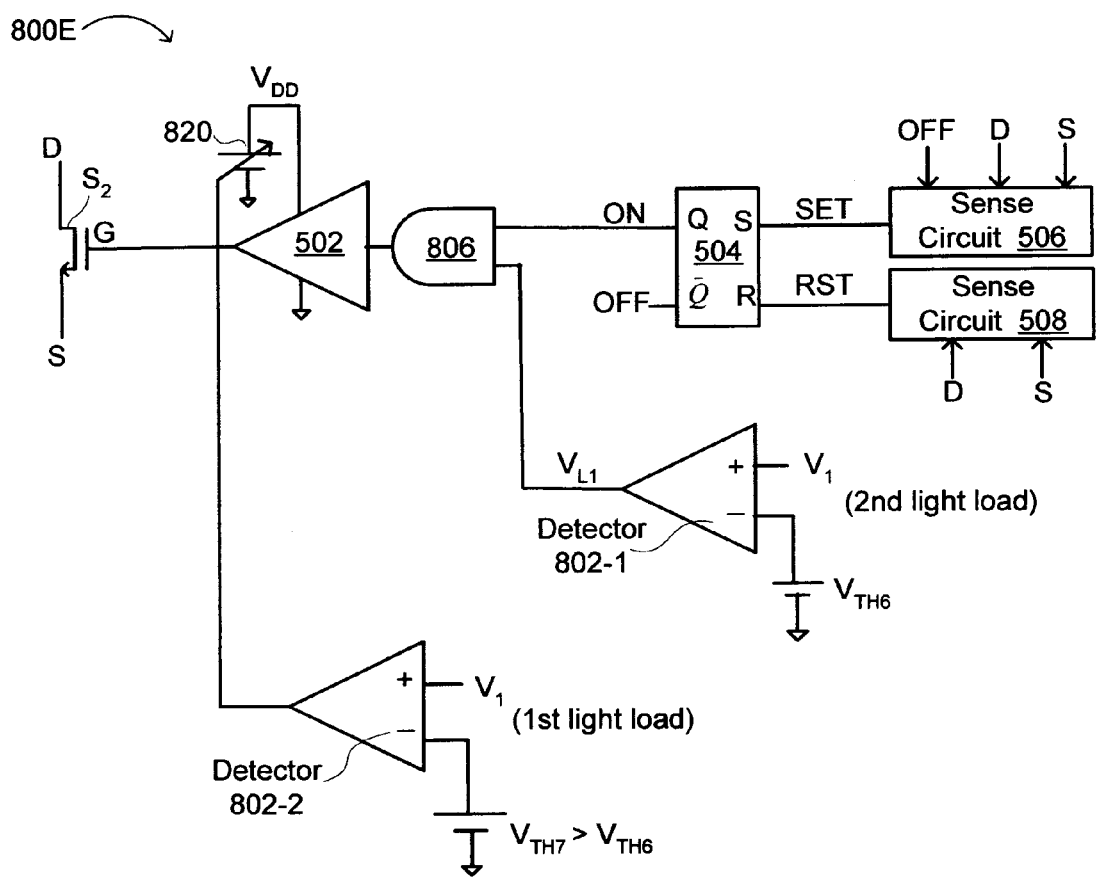
FIG. 8E shows a schematic diagram of an example circuit that reduces a gate voltage for turning on the MOS transistor to reduce power loss at light loads, in accordance with embodiments of the present invention.

Under light load conditions when conduction loss is relatively small (e.g., less than about 0.1 W), gate driving losses may be reduced in an effort to maintain high efficiency. In a self-driven configuration, the switching frequency may not be actively controlled. The examples shown below in FIGS. 8A, 8B, and 8E, are directed to reducing effective date driving losses for driving MOS transistor $S_2$. Waveforms showing accompanying operation, etc., are shown in FIGS. 8C and 8D.

Referring now to FIG. 8A, shown is a schematic diagram 800A of an example circuit that turns off a MOS transistor to reduce gate driving losses under light load conditions in accordance with embodiments of the present invention. When detection circuit 802 detects a light load condition (e.g., by using sensed current information signal $V_1$), MOS transistor $S_2$ may not be allowed to turn on by way of AND-gate 806. For example, current sense signal $V_1$ can indicate load conditions, and may be provided externally by a user, or by a control circuit that samples current information in MOS transistor $S_2$ when it is on. Accordingly, associated gate driving loss (on gate node "G") may be reduced. Under such a light load condition (e.g., less than about 5-10% of a full load condition), the load current may be low enough so that any conduction loss increases due to internal body diode conduction is less than the gate driving loss in the MOS transistor.

In a high current (e.g., greater than about 10 A) application, multiple MOS transistors or multiple blocks of MOS transistor cells may be used in a parallel arrangement to reduce associated power losses. This approach can decrease current sense accuracy at light loads because of lower signal to noise ratios. The gate driving loss at light loads can exceed the conduction loss. However, under certain load conditions, turning off all MOS transistors does not result in a reduced overall power loss, which is a sum of conduction losses of gate driving losses. Therefore, part of a synchronous rectifier may be turned off first to reduce an overall power loss under light load conditions. Gradually, other parallel MOS transistors or paralleled MOS transistor blocks can be turned off as the load decreases to optimize efficiency.

Referring now to FIG. 8B, shown is a schematic diagram 800B of an example circuit that turns off a portion of a MOS transistor under first light load conditions, and turns off the MOS transistor under second light load conditions, in accordance with embodiments of the present invention. While this particular example is shown for two parallel MOS transistors (e.g., $S_2$-1 and $S_2$-2) being turned off in two steps under light load conditions, more than two of such parallel devices and associated circuitry (e.g., drivers 502, AND-gates 806, detectors 802, etc.), can be accommodated in particular embodiments, such as to be turned off in more than two steps under light load conditions.

In the particular example of FIG. 8B, detection circuit 802-2 can detect a first light load condition, and an associated part (e.g., $S_2$-2) of MOS transistor $S_2$ can be turned off via AND-gate 806-2 and driver 502-2 controlling gate node G-2. Under a first light load condition, an overall power loss $P_{loss}$ can decrease because a reduction in the gate drive loss associated with a smaller MOS transistor more than compensates for an increase in conduction due to a higher $R_{dson}$. When the load further decreases to a second light load condition, detection circuit 802-1 can turn off the complete synchronous rectifier $S_2$ via AND-gate 806-1 and driver 502-1 controlling gate node G-1.

In FIG. 8C, shown are example waveform diagrams 800C illustrating power loss reduction for the circuit shown in FIG. 8B. In high current applications, the MOS transistor gate voltage may be over-driven (e.g., up to a level of from about 5 V to about 12 V) to achieve a minimum $R_{dson}$.

FIG. 8D shows an example $R_{DSON}$ versus $V_{GS}$ curve 800D. As shown, as $V_{GS}$ increases, $R_{dson}$ decreases. However, as $V_{GS}$ increases beyond $V_{GS1}$ (e.g., greater than about 5 V for a MOS transistor with a gate to source threshold of about 1 V), the reduction ratio of $R_{dson}$ may become much smaller as compared to an increased ratio of $V_{GS}$. As discussed above, the gate driving loss may be proportional to the $V_{GS}^2$. Therefore, when the load current is low enough (e.g., less than about 5-10% of a full load current), reducing the $V_{GS}$ from $V_{GS2}$ to $V_{GS1}$ (e.g., from about 12 V to about 5 V for a MOS transistor with a gate to source threshold of about 1 V) may be desirable in terms of reducing overall power loss.

Referring now to FIG. 8E, shown is a schematic diagram 800E of an example circuit that reduces a gate voltage for turning on the MOS transistor to reduce power loss at light loads, in accordance with embodiments of the present invention. Once detection circuit 802-2 detects a first light load condition, a supply voltage ($V_{DD}$) on gate driver 502 may be reduced (e.g., from about 12 V to about 5 V). Gate G on voltage may thus be decreased to conserve gate driving loss. Under a first light load condition, a reduction of such gate driving loss can exceed an increase of $R_{dson}$ related conduction loss.

The supply voltage $V_{DD}$ to gate driver 502 can be actively regulated lower by a linear or switching regulator 820. When a linear regulator is used, the reduction of gate driving loss may be proportional to $V_{GS}$ instead of $V_{GS}^2$. To maximize efficiency improvement, a switching regulator may be used to regulate $V_{DD}$ lower under light load conditions. When the load current continues decreasing and enters a second light load condition, detection circuit 802-1 can turn off MOS transistor $S_2$ throughout a switching cycle via AND-gate 806.

Exemplary Method of Controlling a Synchronous Rectifier

In one example, a method of controlling a synchronous rectifier includes: (i) sensing a voltage between first and second power terminals of a synchronous rectifier device prior to a turn-on of the synchronous rectifier device; (ii) adjusting a timing of the turn-on of the synchronous rectifier device using a first control signal; (iii) sensing a voltage between the first and the second terminals of the synchronous rectifier device after a turn-off of the synchronous rectifier device; (iv) adjusting a timing of the turn-off of the synchronous rectifier device using a second control signal; and (v) driving a control terminal of the synchronous rectifier device using a gate control signal, the gate control signal being generated from the first and second control signals.

Figure 9:
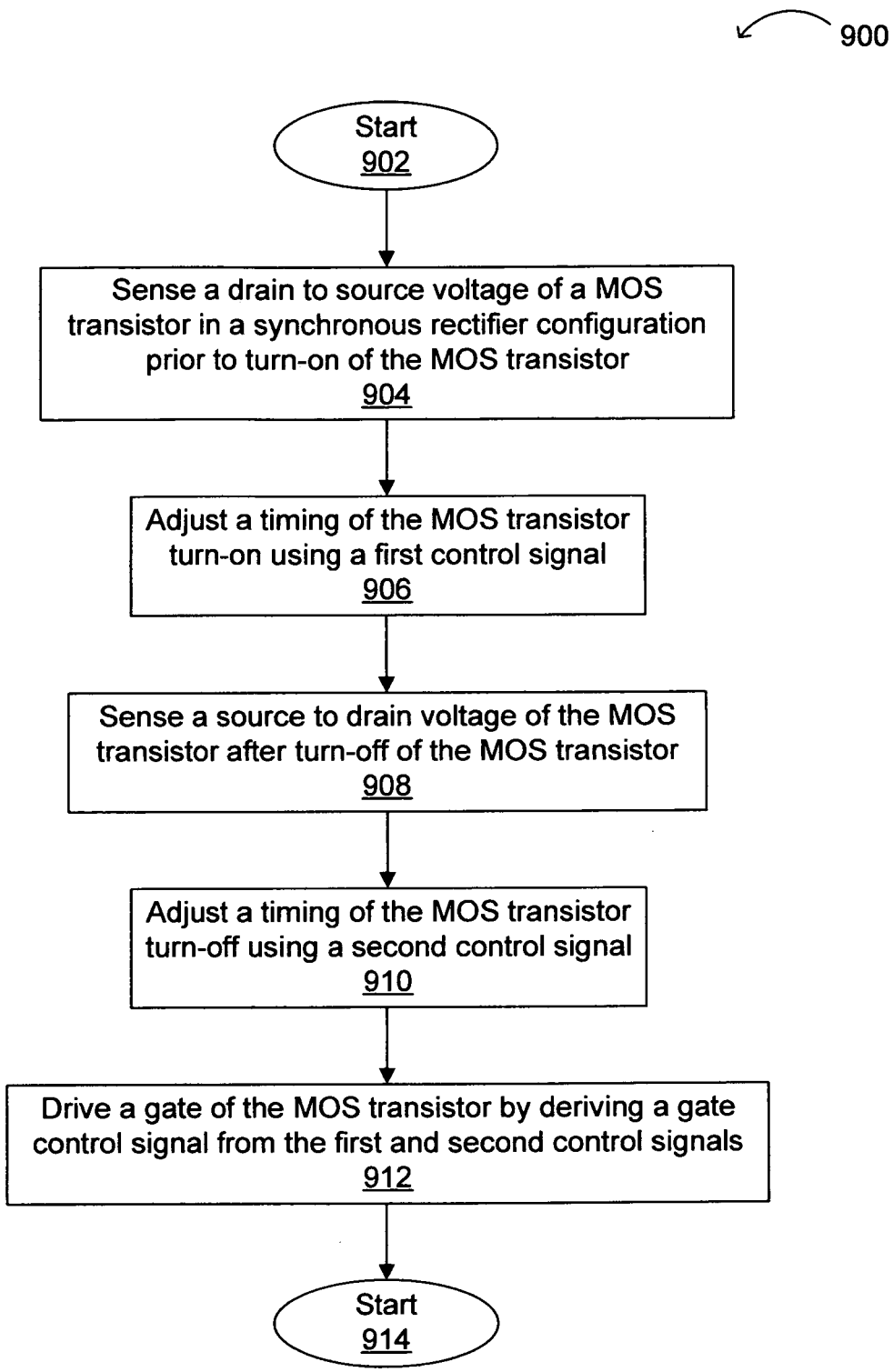
FIG. 9 shows a flow diagram of an example method of controlling a synchronous rectifier in accordance with embodiments of the present invention.

Referring now to FIG. 9, shown is a flow diagram 900 of an example method of controlling a synchronous rectifier in accordance with embodiments of the present invention. The flow can begin (902), and a drain to source voltage of a MOS transistor prior to turn-on of the transistor can be sensed (904). For example, the MOS transistor can be arranged in a synchronous rectifier configuration (e.g., transistor $S_2$ in FIG. 1B). A timing of turn-on of the MOS transistor can be adjusted using a first control signal (906). For example, the first control signal can be a "SET" signal as shown in FIG. 5. A source to drain voltage of the MOS transistor can be sensed after turn-off (908). A timing of turn-off of the MOS transistor can be adjusted using a second control signal (910). For example, the second control signal can be an "RST" signal as shown in FIG. 5. A gate of the MOS transistor can then be driven (e.g., using driver 502) by deriving a gate control signal from the first and second control signals (912), completing the flow (914).

While the above examples include circuit and structural implementations of synchronous rectifiers, one skilled in the art will recognize that other technologies and/or structures can be used in accordance with embodiments. Further, one skilled in the art will recognize that other device circuit arrangements, elements, and the like, may also be used in accordance with embodiments. For example, although the control circuitry described above can be implemented using AND-gates, S-R flip-flops, detectors, comparators, and/or amplifiers particular embodiments are also applicable to other circuit components. Also, methods and circuits discussed herein can also be applied to different power devices (e.g., a p-type MOS transistor, BJT devices, etc.), and to different topologies (e.g., forward, half bridge, full bridge, etc.) converters. In addition, while the synchronous rectifiers discussed herein are applicable to isolated power supplies, particular embodiments are also applicable to other voltage regulator topologies.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A synchronous rectifier control circuit, comprising:
  a) a first sense circuit configured to sense a first voltage across first and second power terminals of a synchronous rectifier device prior to a turn-on of said synchronous rectifier device, and to generate a first control signal from said first sensed voltage and a complementary output of a flip-flop circuit, wherein a timing of said turn-on of said synchronous rectifier device is adjustable using said first control signal, and wherein said synchronous rectifier device comprises one or more transistors coupled in parallel to said first and second power terminals;
  b) a second sense circuit configured to sense a second voltage across said first and second power terminals of said synchronous rectifier device prior to a turn-off of said synchronous rectifier device, and to generate therefrom a second control signal, wherein a timing of said turn-off of said synchronous rectifier device is adjustable using said second control signal; and c) a driver control circuit configured to receive said first and second control signals, and to generate therefrom a gate control signal configured to drive a control terminal of said synchronous rectifier device to control said turn-on and said turn-off of said synchronous rectifier device, wherein said driver control circuit comprises said flip-flop circuit that is set by said first control signal to control said turn-on of said synchronous rectifier device, and reset by said second control signal to control said turn-off of said synchronous rectifier device.

2. The synchronous rectifier control circuit of claim 1, wherein said first sense circuit comprises:

a) a first detection circuit configured to generate a first turn-on signal from a comparison of said first sensed voltage to a first threshold voltage; and b) a second detection circuit configured to generate a second turn-on signal from a comparison of said first sensed voltage to a second threshold voltage, wherein said second turn-on signal is activated after said first turn-on signal is activated, and wherein said first control signal is activated from said first sense circuit when said second turn-on signal is activated within a predetermined first delay of activation of said first turn-on signal.

3. The synchronous rectifier control circuit of claim 2, wherein said first sense circuit further comprises a third detection circuit, said third detection circuit being configured to generate a first delay adjustment control signal for adjusting a timing of said first control signal.

4. The synchronous rectifier control circuit of claim 3, wherein said third detection circuit further comprises a comparator, said comparator being configured to compare said first sensed voltage to a third threshold voltage during a first interval after activation of said second turn-on signal, and to generate said first delay adjustment control signal based on an output of said comparator.

5. The synchronous rectifier control circuit of claim 3, wherein said third detection circuit further comprises an amplifier, said amplifier being configured to amplify a difference between a third threshold voltage and said first sensed voltage during a first interval after activation of said second turn-on signal, and to generate said first delay adjustment control signal based on an output of said amplifier.

6. The synchronous rectifier control circuit of claim 3, wherein said first sense circuit further comprises a delay circuit, said delay circuit being configured to generate a second delay after activation of said first turn-on signal, wherein a duration of said second delay is controlled by said first delay adjustment control signal, said second delay being configured to adjust a timing of said first control signal.

7. The synchronous rectifier control circuit of claim 3, wherein said first sense circuit is configured to modulate said first threshold voltage to adjust a timing of said first control signal by said first delay adjustment control signal.

8. The synchronous rectifier control circuit of claim 3, wherein said first sense circuit is configured to modulate said second threshold voltage to adjust a timing of said first control signal using said first delay adjustment control signal.

9. The synchronous rectifier control circuit of claim 1, wherein said second sense circuit comprises a fourth detection circuit, said fourth detection circuit being configured to generate a first turn-off signal by comparing said second sensed voltage against a fourth threshold voltage, said first turn-off signal being configured to adjust a timing of said second control signal.

10. The synchronous rectifier control circuit of claim 9, wherein said second sense circuit further comprises a fifth detection circuit, said fifth detection circuit being configured to generate a second delay adjustment control signal for adjusting a timing of said second control signal.

11. The synchronous rectifier control circuit of claim 10, wherein said fifth detection circuit further comprises a comparator, said comparator being configured to compare a fifth threshold against said second sensed voltage during a second internal after activation of said second turn-off signal, and to generate said second delay adjustment control signal based on an output of said comparator.

12. The synchronous rectifier control circuit of claim 10, wherein said fifth detection circuit further comprises an amplifier, said amplifier being configured to amplify a difference between a fifth threshold and said second sensed voltage during a second internal after activation of said second turn-off signal, and to generate said second delay adjustment control signal based on an output of said amplifier.

13. The synchronous rectifier control circuit of claim 10, wherein said second sense circuit further comprises a delay circuit, said delay circuit being configured to generate a third delay after activation of said first turn-off signal, wherein a duration of said third delay is controlled by said second delay adjustment control signal, said third delay being configured to adjust a timing of said second control signal.

14. The synchronous rectifier control circuit of claim 10, wherein said second sense circuit is configured to modulate said fourth threshold voltage to adjust a timing of said second control signal.

15. The synchronous rectifier control circuit of claim 1, wherein said one or more transistors comprises an N-type metal-oxide-semiconductor (NMOS) transistor, said first power terminal being a source of said NMOS transistor, said second power terminal being a drain of said NMOS transistor.

16. The synchronous rectifier control circuit of claim 1, further comprising:

a) a first detection circuit configured to detect a first load condition; and b) digital logic configured to receive an output from said first detection circuit, said digital logic providing a drive loss control signal to said driver control circuit to reduce a driving loss of said control terminal when said first load condition is detected.

17. The synchronous rectifier control circuit of claim 1, wherein said gate control signal is not received as an input to said first or said second sense circuits.

18. The synchronous rectifier control circuit of claim 16, wherein said first detection circuit is configured to receive a sensed current information signal for comparison against a threshold voltage.

19. The synchronous rectifier control circuit of claim 16, wherein said driving loss of said control terminal is reduced by turning off said synchronous rectifier device when said first load condition is detected.

20. The synchronous rectifier control circuit of claim 16, further comprising a plurality of second detection circuits, each said second detection circuit corresponding to one of a plurality of parallel synchronous rectifier devices, wherein said synchronous rectifier device is arranged as said plurality of parallel synchronous rectifier devices.

21. The synchronous rectifier control circuit of claim 20, wherein each said second detection circuit is configured to turn off said corresponding parallel synchronous rectifier devices in response to a sensed current information signal comparison against a predetermined threshold.

22. The synchronous rectifier control circuit of claim 21, further comprising a plurality of digital logic blocks, wherein each said digital logic block is configured to turn off a drive of said corresponding parallel synchronous rectifier devices when said first load condition is detected.

23. A method of controlling a synchronous rectifier in a transformer based switching power converter, the method comprising:
   a) sensing, by a first sense circuit, a first voltage across first and second power terminals of a synchronous rectifier device prior to a turn-on of said synchronous rectifier device, wherein said synchronous rectifier device comprises one or more transistors coupled in parallel to said first and second power terminals;
   b) adjusting a timing of said turn-on of said synchronous rectifier device using a first control signal that is generated from said first sense circuit by using said first sensed voltage and a complementary output of a flip-flop circuit;
   c) sensing, by a second sense circuit, a second voltage across said first and second power terminals of said synchronous rectifier device prior to a turn-off of said synchronous rectifier device;
   d) adjusting a timing of said turn-off of said synchronous rectifier device using a second control signal that is generated from said second sense circuit; and
   e) driving a control terminal of said synchronous rectifier device using a gate control signal, said gate control signal being generated from said first and second control signals to control said turn-on and said turn-off of said synchronous rectifier device, wherein said gate control signal is generated by setting said flip-flop circuit using said first control signal to control said turn-on of said synchronous rectifier device, and resetting said flip-flop circuit using said second control signal to control said turn-off of said synchronous rectifier device.

24. The method of claim 23, wherein said adjusting said timing of said turn-on of said synchronous rectifier device further comprises:
   a) generating a first turn-on signal by comparing said first sensed voltage against a first detection threshold; and
   b) generating a second turn-on signal by comparing said first sensed voltage against a second detection threshold, wherein activation of said second turn-on signal occurs after activation of said first turn-on signal, said second control signal being activated when activation of said second turn-on signal occurs within a predetermined first delay of activation said first turn-on signal.

25. The method of claim 24, wherein generating said first turn-on signal comprises:
   a) sensing said first voltage during a first interval after activation of said second turn-on signal; and
   b) adjusting said first detection threshold based on said first sensed voltage in said first interval.

26. The method of claim 24, wherein generating said second turn-on signal comprises:
   a) sensing said first voltage during a first interval after activation of said second turn-on signal; and
   b) adjusting said second detection threshold based on said first sensed voltage in said first interval.

27. The method of claim 23, wherein said adjusting said timing of said turn-on of said synchronous rectifier device comprises:
   a) generating a first turn-on signal by comparing said first sensed voltage against a first detection threshold;
   b) initiating a second delay after activation of said first turn-on signal;
   c) generating a second turn-on signal by comparing said first sensed voltage against a second detection threshold;
   d) sensing a third voltage between said first and said second power terminals during a first interval after activation of said second turn-on signal;
   e) programming said second delay based on said third sensed voltage in said first interval; and
   turning on said synchronous rectifier device after said second delay.

28. The method of claim 23, wherein said adjusting said timing of said turn-off of said synchronous rectifier device comprises:
   a) generating a first turn-off signal by comparing said second sensed voltage against a fourth detection threshold;
   b) generating a third delay after activation of said first turn-off signal;
   c) generating a second turn-off signal to turn off said synchronous rectifier device following said third delay;
   d) sensing a fourth voltage between said first and said second power terminals during a second interval after activation of said second turn-off signal; and
   e) programming said third delay based on said fourth sensed voltage during said second interval.

29. The method of claim 28, wherein generating said first turn-off further comprises programming said fourth detection threshold according to said second sensed voltage in said second interval.

30. The method of claim 23, further comprising reducing an amplitude of said gate control signal when said synchronous rectifier device is on and a light load condition is detected.

31. The method of claim 30, further comprising independently controlling each of a plurality of parallel synchronous rectifier devices to reduce driving loss when a light load condition is detected, said synchronous rectifier device being arranged as said plurality of parallel synchronous rectifier devices.

32. The method of claim 23, further comprising:
   a) detecting a first load condition;
   b) reducing a driving loss of said control terminal when said first load condition is detected; and
   c) adjusting a timing of said gate control signal to reduce power loss in said synchronous rectifier.

33. The method of claim 32, further comprising reducing an amplitude of said gate control signal when said first load condition is detected.

34. The method of claim 32, further comprising turning off a portion of said synchronous rectifier device when said first load condition is detected.

\* \* \* \* \*